United States Patent [19]

Ku

[11] 4,129,994
[45] Dec. 19, 1978

[54] INSTANT-COOLING ICE-MAKER AIR CONDITIONER

[76] Inventor: Paul H. Y. Ku, 47-50 59th St./Apt. 6E, Woodside, N.Y. 11377

[21] Appl. No.: 733,090

[22] Filed: Oct. 18, 1976

[51] Int. Cl.² .......................................... F25D 17/02
[52] U.S. Cl. ...................................... 62/179; 62/185; 62/236
[58] Field of Search ................. 62/96, 185, 244, 179, 62/236, 59

[56] References Cited

U.S. PATENT DOCUMENTS 2,153,696  4/1939  Philipp ................................ 62/96 X

*Primary Examiner*—William E. Wayner

[57] ABSTRACT

In a preferred embodiment, a thermostatically-controlled variable air-circulation mechanism and a thermostatically-controlled coolant-pump circulatable of coolant from a coolant vessel to the fan-containing cooling-coils air-space enclosure cyclically, and a coolant vessel-thermostat and freezing coils connected with an electrical freezer mechanism, are powered by dual batteries in electrical parallel when in use, and the freezer mechanism by solely one thereof when ignition is off for an automobile by virtue of solenoid switch, the fans being run in electrical series at predetermined lower temperatures and in parallel at predetermined higher temperatures by virtue of circuitry and thermostatically-controlled other solenoid switches, maximum ice-production being controlled thermostatically.

10 Claims, 4 Drawing Figures

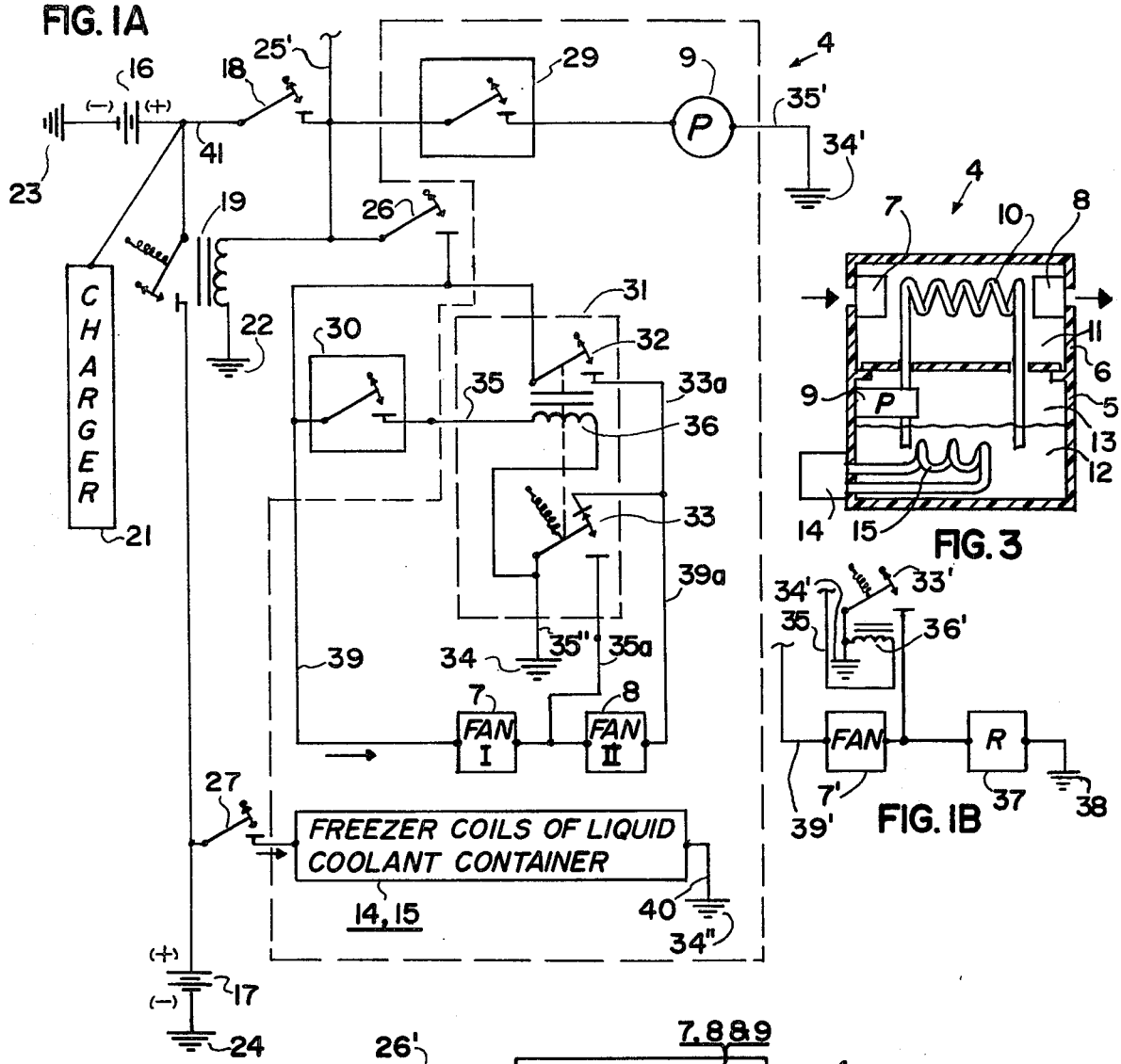
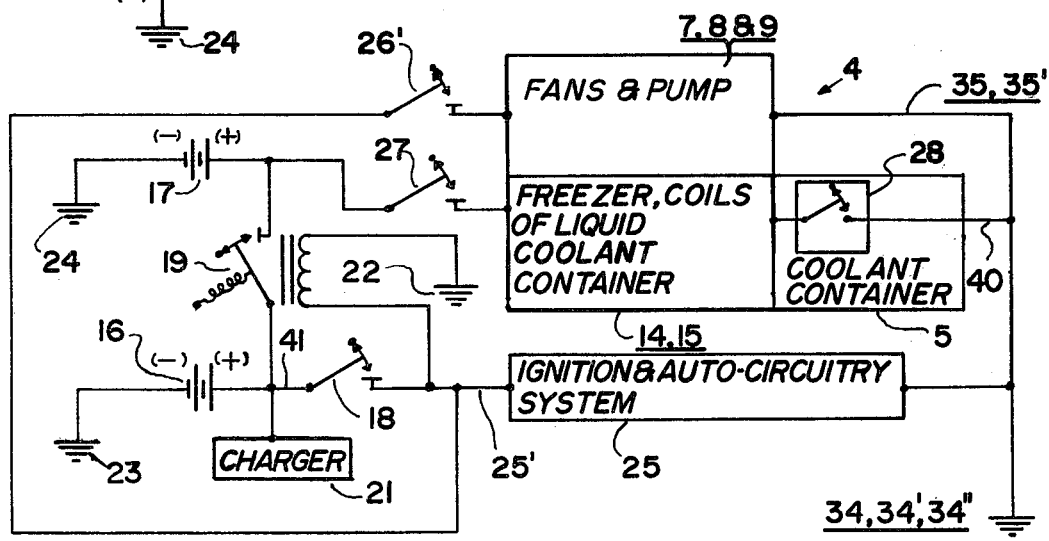

INSTANT-COOLING ICE-MAKER AIR CONDITIONER

This invention relates to an instant-cooling electrically battery-powered air conditioner.

BACKGROUND TO THE INVENTION

Prior to the present invention, air conditioners for automobiles have been expensive luxuries requiring an especially-designed automobile at the time of purchase thereof, and in addition to the excessive cost of purchase of an automobile containing the same, the required large amount of instant-power necessary to momentarily and quickly reduce temperature has required the consumption of large amounts of gasoline fuel, the initial required power being substantially greater in proportion than that required for mere maintenance of the temperature at a predetermined low temperature once achieved by initial cooling. Moreover, automobiles not initially designed for such air conditioning are heretofore doomed to remain hot and sultry environments forever, in heated weather.

SUMMARY OF THE INVENTION

Accordingly, an object of the present invention is to provide an efficient air conditioner.

Another object is to provide an air conditioner capable of instant cooling at high efficiency of power.

Another object is to obtain improved efficiency of battery power utilized in powering an air conditioner.

Another object is to obtain an air conditioner characterized by easy maintenance.

Another object is to obtain an air conditioner having prolonged cooling period capacity.

Another object is to obtain an air conditioner characterized by easy and accessible repair.

Another object is to obtain an air conditioner having a multiplicity of fans interchangably drivable in electrical series and parallel as a mechanism of efficient variable air circulation rate.

Another object is to maximize reserve battery power efficiency and usage.

Another object is to provide for efficient ice production as a source of instant cooling.

Another object is to provide efficient thermostatic control of air and coolant circulation.

Another object is to provide for reenergizing power sources for the air conditioner and freezer system thereof.

Broadly the invention may be defined as an ice-making air-conditioner device which includes a coolant vessel, air-cooling structure shaped as a partial enclosure with inlet and outlet ports to space therewithin, coolant conduits therefor, a circulation pump connected with the conduits, one or more fans positioned to circulate air into the inlet port and out-of the outlet port, and a freezer device for producing ice within the coolant vessel, and circuitry providing for driving respective motors of fans, pump and the freezer device. Preferably at least two separate batteries are provided, one at all times for powering the freezer device, except when switched-off, and the other for connecting in electrical parallel therewith for facilitating or sharing in the driving of the freezer as well as being the primary automobile conventional battery power source, the other battery also powering the fans and the pump preferably, and other accessories of the automobile as well as the ignition.

In preferred embodiments in addition to the above, the fan(s) is/are thermostatically controlled, as is the pump, as is the freezer device. In particular, where there are two fans, there is a thermostatic switch outside the air-conditioning device set to run the fans in series when outside air is at cooler temperatures, and in parallel electrically at more elevated temperatures to obtain thereby greater circulation when outside air is at elevated air temperatures. The thermostat controlling the pump cuts-in solely when temperature within the air-cooling space has reach a predetermined elevated temperature, and cuts-out when the air therewithin falls below a predetermined temperature. In the coolant vessel containing the coolant circulated by the pump, a thermostat is set to turn-off the freezer device whenever the temperature therein drops to a predetermined lower temperature, and cuts-in when above that temperature, such as 31° Fahrenheit, in order to avoid an excessive amount of ice forming.

Where there is a single fan within the air-cooling space, a resistor is placed in electrical series therewith in order to cut-in the resistor at lower cooling temperatures, resulting in limited air circulation, and the resistor is cut-out by the thermostatic switch at predetermined higher temperatures, to result in elevated temperature-greater air circulation.

In another preferred embodiment, circuitry includes a solenoid switch in which the coils thereof are in electrical series with the ignition switch, and this solenoid switch making and breaking connection between the two battery sources, a turning-on of the ignition switch activating the solenoid switch to thereby place the batteries into electrical parallel, as well as thus also connecting a generator or equivalent battery-charger to the two batteries in order to recharge both during use of the automobile motor.

Each of the pump, fans and freezer device have override off-on switches preferably.

The invention may be better understood by making reference to the following illustrative Figures.

THE FIGURES

FIG. 1A illustrates a typical diagrammatic electrical circuitry of the present invention.

FIG. 1B illustrates an in-part illustration of a variation on the circuitry of FIG. 1A.

FIG. 2 illustrates more diagrammatically the electrical circuitry of the embodiment of FIG. 1, together with some additional features.

FIG. 3 illustrates in diagrammatic cross-sectional view, the mechanical structure of the invention having the circuitries of FIGS. 1A and 2.

DETAILED DESCRIPTION OF THE INVENTION

While FIGS. 1A and 2 represent different emphasis of illustration, the circuitry is substantially identical for all practical purposes, and accordingly indicia represent common elements of the two figures, and FIG. 3 in like manner utilizes the same indicia for any common elements recognizable in the other Figures.

In particular, the ice-making air-conditioner primary unit 4 includes a coolant-container vessel 5 and an air-cooling enclosure structure 6 with inlet and outlet ports, having a fan 7 in the inlet port for drawing air into the enclosure space 11 of the enclosure structure, and fan 8 in the outlet for exhausting cooled air therefrom after cooling the air passing over coils 10 within the air-cooling space, coolant being pumped through the coils 10 by pump 9, coolant 12 being within the coolant-container vessel 5, within space 13 thereof. Freezer device 14 has freezer coils 15 within the coolant 12, for the freezing thereof and/or at least maintaining it at a low cooling temperature for circulation by the pump 9.

Batteries 16 and 17 are the power sources. Ignition switch 18 connects the batteries into electrical parallel by closing the ignition switch to thereby close the switch 19.

The charger 21 charges both batteries 16 and 17 when the engine of the automobile is running — with the ignition switch on.

Typical ground leads are represented as 22, 23, 24, 34, 34', 34'', but could obviously be interconnected into a common ground.

The ignition and auto-circuitry system 25 is fed by typical lead wire 25'. The dual fans 7 and 8 have manual switches 26 and 26', and the freezer device has manual switch 27.

Thermostat 28 opens and closes the electrical circuitry of the freezer unit 14 and coils 15 thereof, described above. The thermostat 29 located within the partial enclosure of the air-conditioner unit 4 shown in FIG. 1A, controls cut-in and cut-out of the pump 9. And the thermostat 30, located outside of the air-conditioner unit 4 as shown in FIG. 1A, controls the cutting-in and cutting-out of the double-throw switches 32 and 33 between lead wires 35 and 35a, for power of leads 33a and 35a and 39a, the closing of the switch 30 sending current through coils 36 to thereby place the fans in electrical parallel for greater cooling air circulation.

Lead wire 35' lead from the pump to ground 34'. Double throw switches 32 and 33 are a part of solenoid switch 31. Lead wire 40 leads to ground 34'' from the freezer unit. Lead 41 leads to the ignition switch 18.

Accordingly, the outside thermostat controls solely the rate of circulation of air, both fans I and II being in electrical series when the thermostat switch 30 is opened as shown in FIG. 1A, whereby as is conventional, the fans in electrical series results in a low circulation as compared to a greater circulation when the fans are in electrical parallel when 1 thermostat switch 30 is closed when outside temperature is elevated.

In the alternate embodiment of FIG. 1B, the lead wire 39 leads to fan 7' and thereafter to resistor (R) 37, on to ground 38 when switch 33' is open; when power is provided through lead 39' and is grounded by a thermostat 30 closing to direct current through lead 35 to coils 36' to close switch 33, thus grounding the fan 7', current flows to ground instead of through the resistance resistor 37, resulting in the fan running at a higher rate of speed. AC fans 7 and 8 run by current in either direction. However, in the FIG. 1B embodiment, the fan may be either DC or AC in type accordingly, in the FIG. 1B embodiment when outside temperature is not very high the open switch 30 of FIG. 1A would result in electric current passing in series through fan 7 and resistance 37, with a corresponding low air circulation, as compared to a closed switch 30 at a more elevated temperature causing switch 33 to close whereby fan 7 is devoid of resistor 37, fan 7 being directly ground through ground 34, resulting greater air circulation by the fan 7.

It should be noted that the coolant may be water, or may be freon, or any other conventional coolant as might be desired. In like manner, the nature of the freezer unit is not critical, being of conventional design as desired. The size of the fans is optional, but is typically a 3 ohms fan run by 12 volts D.C., at typically 4 amps. When the two fans are switched from parallel to electrical series, the power demand is reduced by three-quarters. Typically, the freezing unit is a 12 volt, 2 amp unit of known conventional type typically normally used in campers and boats.

For batteries, for example, the battery for a Volks Wagon is 45 ampere hours, and for Cadillacs is 95 ampere hours, and for medium-sized cars is 60 ampere hours. The above-noted ice-maker draws 2 amperes per hour. A 60 ampere battery will last more than 24 hours driving the freezer unit.

A Volks Wagon generator produces 360 watts. The alternator of a Toronado produces 750 watts. A medium-sized car generator produces 520 watts. A 360 watts generator will charge 60 ampere hour battery in a 2 hour period.

Accordingly, a car which runs at least 2 hours per day, will keep the second battery in full charge and maintain the power for the ice-maker 24 hours, making about 15 pounds of ice in 24 hours.

In a typical system of the invention, thermostats are set as follows. When the ignition key is turned-on, if the temperature is over 80° Fahrenheit, the pump and fan(-high) will automatically turn onto high speed, delivering 12,000 BTU per hour of cold air to the car interior, and the car will be cooled within 15 seconds — as proven by actual tests. When cooled down to 80° or lower, the speed of the fans automatically jumps to low speed to deliver 3,000 BTU per hour to keep the car cool. When car inside space temperature gets down to 74° Fahrenheit, the speed of the fans remains the same, but the pump turns-off and thus the freon (or ice-water) stops circulating, and the temperature of the car does not go down any further. If car temperature goes up, the pump starts, and if car temperature exceeds 80°, the fans turn-on high circulation again.

It is within the scope of the invention to make such variations and substitution of equivalents as would be apparent to a person of ordinary skill.

I claim:

1. An ice-making air-conditioner device comprising in combination: a coolant vessel; an air-cooling structure forming a partial enclosure with inlet and outlet ports; coolant conducts mounted to circulate coolant from the coolant vessel through space of the partial enclosure of the air-cooling structure, and back to the coolant vessel; a pump connected to pump and circulate coolant through said coolant conduits; freezer means for freezing coolant when provided with electrical power, the freezer means including freezer coils within the coolant vessel; fan means for circulating air into the inlet port through space of the partial enclosure and out of the outlet port of the coolant vessel; circuitry means for providing electrical power and switches for the pump, the freezer means, and the fan means, and for providing interconnected circuitry therefor such that ice is formed from the coolant during perods of non-use of the pump; and two separate first and second electrical power sources interconnected by said circuitry means, the first electrical power source having circuitry adapted to provide electrical power to the freezer means during at-least periods of non-use and disconnection of the second electrical power source from the freezer means, and the second electrical power source having circuitry adapted to intermittently provide electrical power in electrical parallel with the first electrical power source, to the freezer means, and the second electrical power source having further circuitry adapted to provide electrical power to said pump and to said fan means, the circuitry means providing the circuitries.

2. An ice-making air-conditioner device of claim 1, in which said fan means includes an electric fan and a first thermostat in a first electrical series with the electric fan and in which said circuitry means includes a second thermostat in a second electrical series with said pump and position within said partial enclosure adapted to turn-off the pump when coolant within the coolant vessel reaches a predetermined low temperature and to turn-on the pump when the coolant within the coolant vessel reaches a temperature above said predetermined low temperature.

3. An Ice-making air-conditioner device of claim 2, in which said fan means includes an electric fan and a first thermostat in a first electrical series with the electric fan and in which said circuitry means includes a second thermostat in a second electrical series with said pump and position within said partial enclosure adapted to turn-off the pump when coolant within the coolant vessel reaches a predetermined low temperature and to turn-on the pump when the coolant within the coolant vessel reaches a temperature above said predetermined low temperature.

4. An ice-making air-conditioner device of claim 1, including electrical battery-charging means for charging said first and second electrical power sources when connected in parallel with one-another, the first and second electrical power sources each including at least one battery.

5. An ice-making air-conditioner device of claim 4, in which the circuitry means includes a first switch means for simultaneously turning on electrical power from the second electrical power source to the pump and to the fan means, and interconnecting in parallel the first electrical power source.

6. An ice-making air-conditioner device of claim 5, in which the fan means includes a first thermostat, and second and third switches controlled thereby interconnected by said circuitry means, adapted for providing a predetermined large amount of air circulation at air temperatures at and above a predetermined elevated temperature and for providing a predetermined lesser amount of air circulation at air temperatures below said predetermined elevated temperature.

7. An ice-making air-conditioner device of claim 6, in which said circuitry means includes a second thermostat in electrical series with said pump and positioned within said partial with enclosure adapted to turn-off the pump when coolant within the coolant vessel reaches a predetermined low temperature and to turn-on the pump when coolant within the coolant vessel reaches a temperature above said predetermined low temperature.

8. An ice-making air-conditioner device of claim 7, in which the fan means includes at least two fans, and the circuitry means mounts said second and third switches such that the two fans are in series by action of said first thermostat when air temperature is below said predetermined elevated temperature, and such that the two fans are in electrical parallel by action of said first thermostat when air temperature is at and above said predetermined elevated temperature.

9. An ice-making air-conditioner device of claim 8, in which said circuitry means includes a selenoid-activatable fourth switch in electrical opening and closing circuit connecting said first and second electrical power sources, interconnected with circuitry of said first switch such that closing of the first switch provides activating power to a solenoid of the fourth switch to thereby close the fourth switch.

10. An ice-making air-conditioner device of claim 5, in which the fan means includes a first thermostat, and an electrical resistor element, a fan & second switch interconnected by the circuitry means, adapted to pass electrical current through only the fan at air temperatures at and above a predetermined elevated temperature to thereby provide a predetermined large amount of air circulation, and further adapted to pass electrical current through both the fan and the electrical resistor element at air temperatures below said predetermined elevated temperature to thereby provide a predetermined lesser amount of air circulation.

* * * * *